(No Model.) 2 Sheets—Sheet 1.

G. R. HOLDEN.
MACHINE FOR REDUCING QUILLS, FEATHERS, &c., TO FIBER.

No. 328,680. Patented Oct. 20, 1885.

Witnesses:
Harry T. Jones.
Albert H. Adams.

Inventor:
George R. Holden
by Weeks & Bond
Attys.

(No Model.) 2 Sheets—Sheet 2.
G. R. HOLDEN.
MACHINE FOR REDUCING QUILLS, FEATHERS, &c., TO FIBER.
No. 328,680. Patented Oct. 20, 1885.
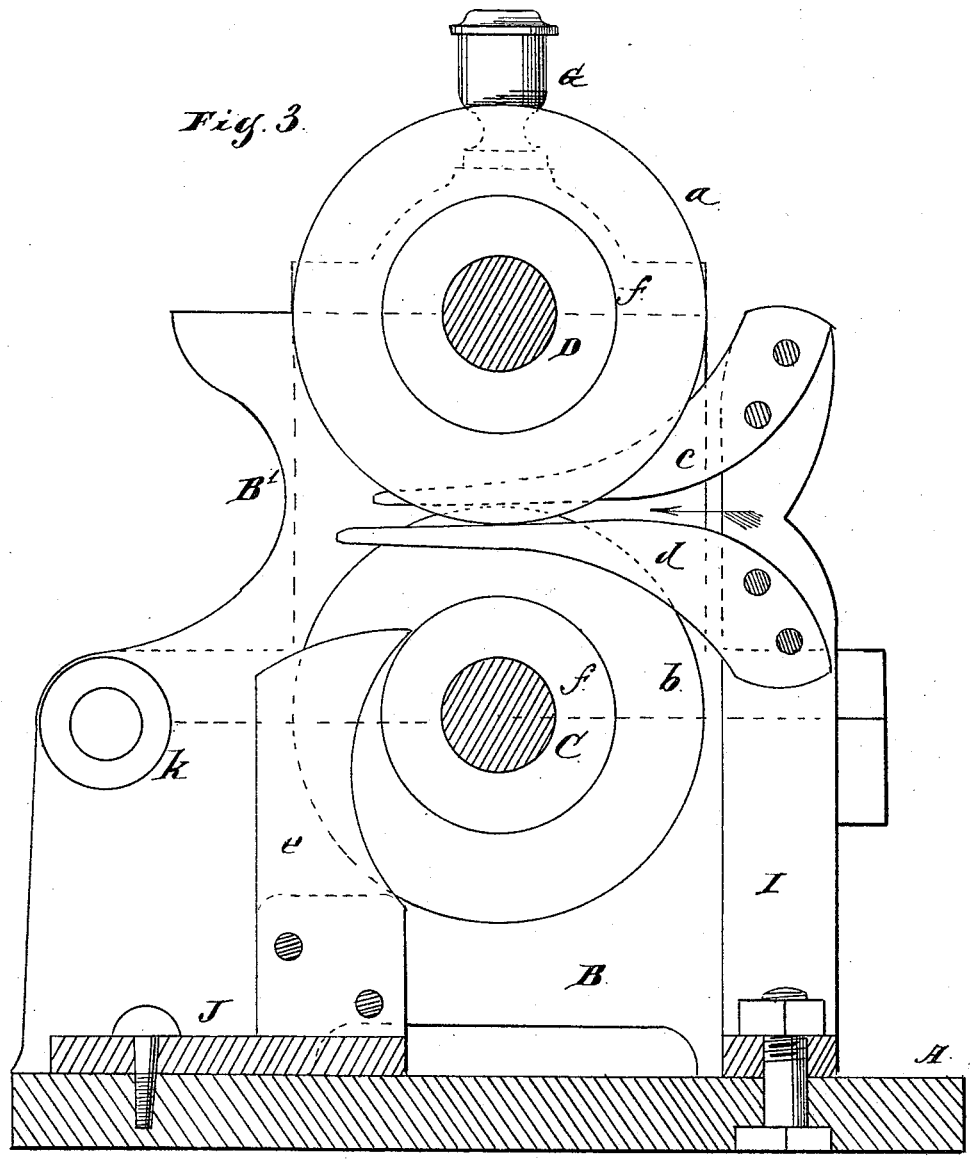

UNITED STATES PATENT OFFICE.

GEORGE R. HOLDEN, OF MICHIGAN CITY, INDIANA, ASSIGNOR TO THE WARREN FEATHERBONE COMPANY, OF CHICAGO, ILLINOIS.

MACHINE FOR REDUCING QUILLS, FEATHERS, &c., TO FIBER.

SPECIFICATION forming part of Letters Patent No. 328,630, dated October 20, 1885.

Application filed March 7, 1885. Serial No. 158,105. (No model.)

*To all whom it may concern:*

Be it known that I, GEORGE R. HOLDEN, residing at Michigan City, in the county of La Porte and State of Indiana, and a citizen of the United States, have invented certain new and useful Improvements in Machines for Reducing Quills, Feathers, &c., to Fiber, of which the following is a full description, reference being had to the accompanying drawings, in which—

Figure 1:
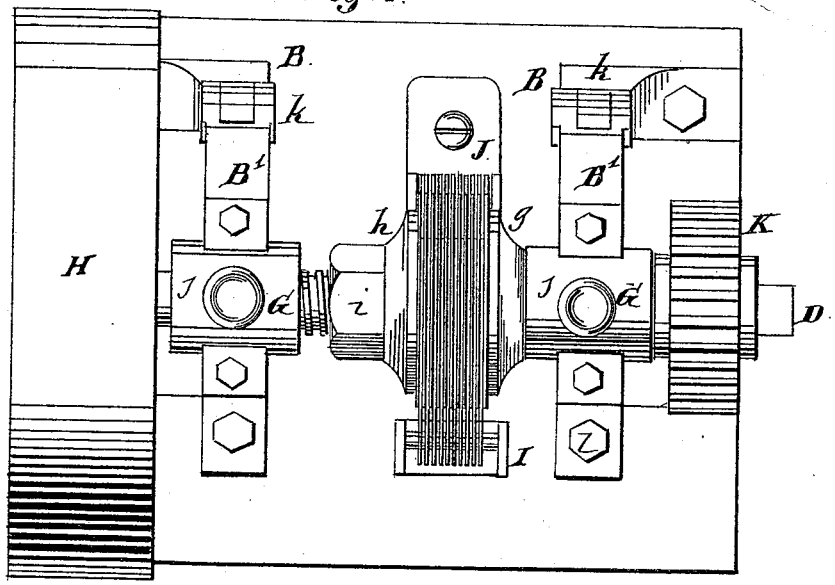
Figure 2:
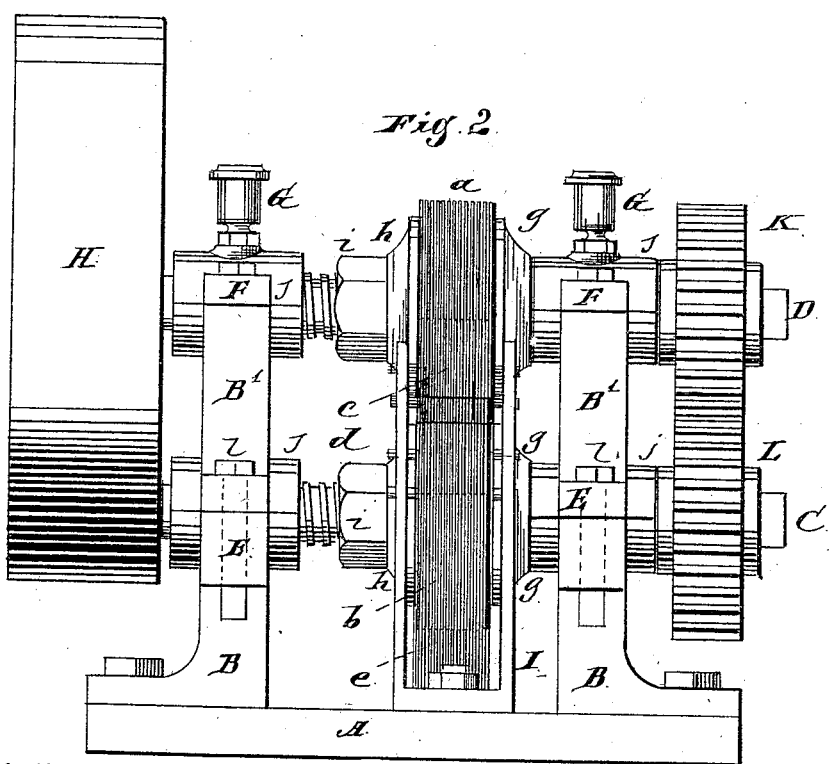

Figure 1 is a top or plan view; Fig. 2, a side elevation; Fig. 3, a vertical cross-section on line $x\ x$ of Fig. 1; Fig. 4, a detail showing the manner of spacing and attaching the cutting-disks to the shaft.

The object of this invention is to provide a machine for reducing quills and other substances into fiber suitable for forming cords, braids, and stiffening when they are formed or consolidated by winding, braiding, or otherwise; and its nature consists in the parts and combinations of parts hereinafter described and claimed as new.

In the drawings, A indicates the bed or base plate; B, posts or supports for the under shaft; B', supports for the upper shaft; C, under shaft; D, upper shaft; E F, boxes; G, oilers; H, drive wheel; I, support for the guides; J, support for the cleaners; K L, gear-wheels; $a$ upper and $b$ lower cutting-disks; $c$ upper and $d$ lower guides; $e$, cleaners; $f$, spacing-disks; $g\ h$, collars; $i$, lock-nut; $j$, upper halves of the boxes E F; $k$, hinge, and $l$ locking-bolt.

The entire machine is usually made of metal, and the base A with the support B may be cast together, or they may be separately made and fitted together, as shown, and the base A may be a part of a larger frame upon which several of these machines are mounted. The lower halves of the boxes E are formed in or attached to these supports, while the upper halves, $j$, are attached to the support B', as shown, or to the under halves of boxes F, as may be most convenient.

The supports B B' are connected together at one side by the hinge $k$, and at the opposite side by the bolt $l$, which bolt may be provided with a key or nut, as desired. By this arrangement the machine may be opened and the top swung over for the purpose of cleaning or repairing the disks $a\ b$ or the guides $c\ d$. When opened, the guides $c\ d$ remain with the under section, as they are attached to the base by a separate support, I.

The upper bearing-boxes are provided with ordinary oilers, G, and the lower with suitable oiling-holes, (not shown.)

The collars $g$ are firmly keyed or otherwise attached to their respective shafts. The cutting-disks $a\ b$ are then applied, each alternating with spacing-disks $f$, and so arranged that they will lap or press each other, as shown in Fig. 3. The spacing-disks $f$ are slightly thicker than the cutting-disks $a\ b$, but they are only given sufficient additional thickness to prevent undue wear without preventing the disks $a\ b$ from cutting and without injuring their operation. When a sufficient number of these disks are thus placed upon their shafts the collar $h$ is applied, and the lock-nut I is screwed up against it with sufficient force to hold the cutting-disks firmly in place, and for this purpose the shafts D C are provided with screw-threads, as shown, the bearing ends of the shaft being small enough to permit of this construction and the application of the nuts $i$.

For cutting quills and other similar articles into strips, from twelve to fifteen of these cutting-disks on each shaft will be sufficient. A greater or less number, however, can be used, as may be desired or may be found necessary.

The disks $a\ b$ are made of steel, and right-angled at their peripheries, so as to form or leave angles sufficiently sharp to do the cutting.

In order to properly guide the quills or other material to be reduced into fiber, the guides $c\ d$ are provided. They are formed of steel plates sufficiently thin to enter into the spaces between the cutting-disks, as shown in Figs. 2 and 3, and project slightly beyond the contact-points of the cutters. They may be spaced by making the ends where they are attached sufficiently thicker to give the spacing; or spacing-plates may be used, as may be found most convenient. They are supported in the standard I by bolts passing through these guides and the standards, as shown in Figs. 2 and 3; and as they are mounted upon a separate support, I, they may be easily removed at any time for cleaning or repairs without disturbing the cutting-disks.

As a further protection against clogging, scrapers e are provided, one for each space between the cutting-disks b, so that in case any of the material or dust passes by the guide d it will be thrown out by these scrapers. The scrapers are attached to a bracket or support, J, as shown in Fig. 2, and they are also separately removable whenever such removal may become necessary.

As shown, power is applied to the upper shaft by the pulley H, and communicated to the lower shaft by the gear K L; but it may be applied to the lower shaft, if desired, by locating that shaft a little higher above the base-plate. The material to be reduced to fiber is fed in as shown by the arrow in Fig. 3.

The operation of the machine will be readily understood from the description, as when the enamel or shells of feathers, with the quills, are fed in, after they have been properly separated and flattened by other machinery or manipulation, they are caught between the cutting-disks a b, and as they are of a uniform thickness, the fibers to which they are reduced are evenly cut of a uniform size, and a complete separation takes place, and by reason of the cutters a forcing the fibers cut by them down in contact with the guides d they are carried out, while those cut by the disks b are forced upward against the guide c and carried out in the same manner.

It will be evident that short pieces, or pieces of any length, of any suitable material, may in this manner be reduced to an even, uniform size of continuous fiber of the length of the material fed in.

This machine is designed for reducing the enamel or coating of quills or feathers to fiber, but it may be used for reducing any other suitable material into fiber.

It will be understood that the disks a b revolve in opposite directions, so as to carry along and reduce the material fed in.

What I claim as new, and desire to secure by Letters Patent, is—

1. The disks a b, having square or cutting edges, and passing and interlocking each other, for reducing the material fed between them to fiber, substantially as specified.

2. The combination of the disks a b with the guides c d, substantially as and for the purpose described.

3. The combination of the cutting-disks a b with the scrapers e, substantially as set forth.

4. The combination and arrangement of the cutting-disks a b and of the guides c d, and scrapers e, substantially as specified.

5. The combination and arrangement of the shaft D, hinged supports B', and cutting-disks a, locked thereon, with the shaft C, fixed supports B, cutting-disks b, locked thereon, guides c d, and scrapers e, substantially as and for the purpose described.

GEORGE R. HOLDEN.

Witnesses:
WASHINGTON P. HARMAN,
EDWARD K. WARREN.